(12) United States Patent
Leigh et al.

(10) Patent No.: US 6,780,233 B1
(45) Date of Patent: Aug. 24, 2004

(54) WETTABILITY IMPROVEMENT OF SPUN-ON RESIST AND THERMOPLASTIC MATERIALS

(75) Inventors: Joseph Leigh, Campbell, CA (US); Jianwei Liu, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 205 days.

(21) Appl. No.: 10/140,980

(22) Filed: May 9, 2002

Related U.S. Application Data
(60) Provisional application No. 60/293,843, filed on May 24, 2001.

(51) Int. Cl.[7] ............................................... C09D 4/00
(52) U.S. Cl. ...................................... 106/311; 106/285
(58) Field of Search .................................. 106/285, 311

(56) References Cited

U.S. PATENT DOCUMENTS

| | | |
|---|---|---|
| 3,198,657 A | 8/1965 | Kimball et al. |
| 3,535,137 A | 10/1970 | Haller et al. |
| 4,201,149 A | 5/1980 | Koester et al. |
| 4,352,839 A | 10/1982 | Olson et al. |
| 4,578,139 A | 3/1986 | Stehouwer |
| 4,996,080 A | 2/1991 | Daraktchiev |
| 5,066,616 A | 11/1991 | Gordon |
| 5,128,207 A | 7/1992 | Formanek et al. |
| 5,135,989 A | 8/1992 | Ziemelis et al. |
| 5,378,511 A | 1/1995 | Cardinali et al. |
| 5,403,617 A | 4/1995 | Haaland |
| 5,571,560 A | 11/1996 | Lin |
| 5,736,195 A | 4/1998 | Haaland |
| 5,922,161 A | 7/1999 | Wu et al. |

Primary Examiner—Bernard Pianalto
(74) Attorney, Agent, or Firm—McDermott Will & Emery LLP

(57) ABSTRACT

A method of manufacturing patterned magnetic or magneto-optical (MO) recording media, comprising steps of:
(a) providing a workpiece including a substrate for a magnetic or magneto-optical (MO) recording medium, the workpiece including at least one major surface of hydrophilic character;
(b) providing a liquid composition comprising a resist or thermoplastic polymer material, adapted for substantially complete wetting of the at least one major surface of the workpiece;
(c) forming a layer of the resist or thermoplastic polymer material on the at least one major surface of the workpiece, comprising applying a thin layer of the liquid composition to the at least one major surface of the workpiece; and
(d) patterning the at least one major surface of the workpiece utilizing the layer of the resist or thermoplastic polymer material.

17 Claims, 1 Drawing Sheet

WETTABILITY IMPROVEMENT OF SPUN-ON RESIST AND THERMOPLASTIC MATERIALS

CROSS-REFERENCE TO PROVISIONAL APPLICATION

This application claims priority from U.S. provisional patent application Serial No. 60/293,843 filed May 24, 2001, the entire disclosure of which is incorporated herein by reference.

FIELD OF THE INVENTION

The present invention relates to improved spin-on resist and/or thermoplastic material compositions with improved wettabiliiy and adhesion to substrate materials, particularly when utilized with substrate materials utilized in the manufacture of servo-patterned, thin film, hard disk magnetic and/or magneto-optical (MO) recording media, and to an improved method of manufacturing such media.

BACKGROUND OF THE INVENTION

Spin coating of wafer-shaped substrates or workpieces is a widely utilized process in the manufacture of semiconductor integrated circuit ("IC") devices for applying thin, uniform thickness layers of a coating material, e.g., a photoresist, to the wafer surfaces as part of photolithographic patterning of the IC component devices, interconnections, etc., and is increasingly employed as part of the manufacturing process of disk-shaped magnetic and/or magneto-optical ("MO") recording media, such as hard disks, for patterning the surfaces of such media, as for example, in the formation of servo patterns therein by means of imprint lithographic techniques.

A typical horizontally oriented spin coating apparatus according to the conventional art is schematically illustrated in the cross-sectional view of FIG. 1, wherein reference numeral 1 designates a disk-shaped rotatable table or vacuum chuck, supported by a rotatable shaft 2 perpendicular to the plane of table 1, the latter being connected to motor 3 for rotation about a central axis. Wafer W is fixed to the surface of table or vacuum chuck 1 by means of suction ports (not shown in the drawing for simplicity).

Reference numeral 4 indicates a process bowl or cup surrounding rotatable table or vacuum chuck 1, the bottom of which includes at least one exhaust port 5 for removal of superfluous (i.e., excess) resist (or other coating material) which is scattered about during the spin coating process due to centrifugal force; reference numeral 6 indicates a plate or flange for regulating the air currents flowing in the process bowl or cup 4 in order to enhance coating thickness uniformity; and reference numeral 7 indicates an exhaust port for connection to an exhaust source; reference numeral 8 designates a coating material dispensing nozzle, operatively connected via feed tube or conduit 9 to a source S of a coating material, e.g., a photoresist.

In operation of the above-described spin coating apparatus, the coating material, e.g., a photoresist, is dispensed from nozzle 8 of source S onto the surface of wafer W as the wafer is spun by means of rotatable chuck 1. The spinning of the wafer distributes the photoresist over the surface of the wafer and exerts a shearing force that separates excess photoresist from the wafer and evaporates solvent therefrom, thereby providing a thin, smooth, uniform thickness layer of photoresist on the surface of the wafer.

As indicated above, thermal imprint lithography has been recently studied and developed as a low cost alternative technique for fine dimension pattern/feature formation in the surface of a substrate or workpiece, e.g., servo pattern formation in hard disk magnetic and/or magneto-optical (MO) recording media. See, for example, U.S. Pat. Nos. 4,731,155; 5,772,905; 5,817,242; 6,117,344; 6,165,911; 6,168,845 B1; 6,190,929 B1; and 6,228,294 B1, the disclosures of which are incorporated herein by reference. A typical thermal imprint lithographic process for forming nano-dimensioned patterns/features, such as servo patterns in the surface of a thin film magnetic and/or MO recording medium or in the surface of a substrate therefor, is illustrated with reference to the schematic, cross-sectional views of FIGS. 2(A)–2(D).

Referring to FIG. 2(A), shown therein is a mold 10 (also termed a "stamper/imprinter") including a main body 12 having upper and lower opposed surfaces, with a molding (i.e., stamping/imprinting) layer 14 formed on the lower opposed surface. As illustrated, molding layer 14 includes a patterned plurality of features 16 having a desired shape or surface contour, e.g., a servo pattern. A workpiece comprised of a substrate 18 carrying a thin film layer 20 on an upper surface thereof is positioned below, and in facing relation to the molding layer 14. The expression "workpiece" or substrate 18, when utilized herein in the context of manufacture of servo-patterned thin film, hard disk magnetic recording media, refers to a bare non-magnetic substrate for the medium, i.e., without any layers formed thereon, or with one or more layers constituting the medium formed thereon. Thin film layer 20, comprised of a resist or thermoplastic polymeric material, e.g., a poly(methylmethacrylate) (hereinafter "PMMA"), is typically formed on the substrate/workpiece surface by a spin coating process such as described supra.

Adverting to FIG. 2(B), shown therein is a compressive molding step, wherein mold 10 is pressed into the thin film layer 20 in the direction shown by arrow 22, so as to form depressed, i.e., compressed, regions 24. In the illustrated embodiment, features 16 of the molding layer 14, e.g., servo pattern features, are not pressed all of the way into the thin film layer 20 and thus do not contact the surface of the underlying substrate 18. However, the top surface portions 24a of thin film 20 may contact depressed surface portions 16a of molding layer 14. As a consequence, the top surface portions 24a substantially conform to the shape of the depressed surface portions 16a, for example, flat. When contact between the depressed surface portions 16a of molding layer 14 and thin film layer 20 occurs, further movement of the molding layer 14 into the thin film layer 20 stops, due to the sudden increase in contact area, leading to a decrease in compressive pressure when the compressive force is constant.

FIG. 2(C) shows the cross-sectional surface contour of the thin film layer 20 following removal of mold 10. The molded, or imprinted, thin film layer 20 includes a plurality of recesses formed at compressed regions 24 which generally conform to the shape or surface contour of features 16 of the molding layer 14. Referring to FIG. 2(D), in a next step, the surface-molded workpiece is subjected to processing to remove the compressed portions 24 of thin film 20 to selectively expose portions 28 of the underlying substrate 18 separated by raised features 26. Selective removal of the compressed portions 24, as well as subsequent selective removal of part of the thickness of substrate 18 (or one or more layers thereon) at the exposed portions 28 thereof, may be accomplished by any appropriate process, e.g., reactive ion etching (RIE) or wet chemical etching.

The above-described imprint lithographic processing is capable of providing submicron-dimensioned features, as by utilizing a mold 10 provided with patterned features 16, e.g., servo pattern features, comprising pillars, holes, trenches, etc., by means of e-beam lithography, RIE, or other appropriate patterning method. Typical depths of features 16 range from about 5 to about 500 nm, depending upon the desired lateral dimension. The material of the molding layer 14 is typically selected to be hard relative to the thin film layer 20, the latter typically comprising a resist or thermoplastic material which is softened when heated. Thus, suitable materials for use as the molding layer 14 include metals, dielectrics, semiconductors, ceramics, and composite materials. Suitable materials for use as thin film layer 20 include resists and thermoplastic polymers, e.g., PMMA, which can be heated to above their glass temperature, $T_g$, such that the material exhibits low viscosity and enhanced flow.

As indicated above, formation of patterned thin film magnetic and MO recording media, e.g., servo-patterned media, by certain pattern replication methods, particularly replication by means of thermal imprint lithography, involve spin coating a layer of a resist or thermoplastic material on the surface of a suitable non-magnetic substrate, e.g., a glass, ceramic, metal, metallized glass or ceramic substrate, or on the surface of a magnetic or MO medium comprising a laminate of layers on a surface of a non-magnetic substrate. However, inasmuch as the conventionally employed resist formulations are based on the use of organic solvents, such as anisole (methoxybenzene) in the case of PMMA-based resists or thermoplastic polymers, they generally are hydrophobic, leading to poor wettabiliiy and/or adhesion to surfaces of the above-enumerated, generally hydrophilic, non-magnetic substrates for magnetic and MO media, or to magnetic and MO media fabricated thereon. The incompatibility between the generally hydrophobic spun-on resist or thermoplastic material compositions and the generally hydrophilic substrate or media surfaces is manifested in poor wetting of the latter by the former, leading to "beading" of the resist or thermoplastic material on the disk surface. According to conventional practices, such undesirable "beading" is overcome either by increasing the quantity of resist or thermoplastic material dispensed by the spin coating apparatus, e.g., by nozzle 8 of source S of the spin coating apparatus of FIG. 1, as by increasing the dispense pressure, or by pre-wetting the substrate with a thin layer of a hydrophilic material, e.g., a layer of water. Either approach, however, is not economically favorable from a large-scale manufacturing viewpoint, in that the cost of the conventionally employed resist or thermoplastic polymer spin-on coating compositions is a significant fraction of the overall manufacturing cost, and pre-wetting increases overall processing time (noting that product yield and throughput are key factors in disk manufacturing technologies). As a consequence, minimization of resist consumption is considered highly desirable in order to maintain economic competitiveness of the above-described thermal imprint lithography process for forming servo patterns in thin film magnetic and/or MO recording media.

In view of the above-described drawbacks and disadvantages inherent in the conventional spin coating methodology for applying a layer of a generally hydrophobic resist or thermoplastic polymeric material, e.g., a PMMA layer, to a generally hydrophilic surface of a substrate, e.g., disk-shaped non-magnetic substrates for magnetic and/or MO recording media (or to the surfaces of disk-shaped magnetic and/or MO recording media), as part of a pattern forming process, there exists a clear need for improved means and methodology for performing spin coating, e.g., resist coating, of generally hydrophilic substrates such as disks for magnetic and/or MO recording media. More specifically, there exists a need for an improved means and methodology for spin coating a generally hydrophilic surface of a substrate with a generally hydrophobic resist or thermoplastic polymeric material, wherein the above-described drawback and disadvantage accruing from the use of incompatible spin coating compositions and substrates is avoided or at least minimized.

The present invention addresses and solves the problems, difficulties, drawbacks, and disadvantages associated with conventional spin coating of a hydrophobic resist composition on a hydrophilic surface of a disk-shaped substrate employed in the manufacture of hard disk magnetic and/or MO recording media, which drawbacks and disadvantages include high resist usage/waste, while maintaining full compatibility with all aspects of conventional automated manufacturing technology for recording media manufacture. Further, the means and methodology afforded by the present invention enjoy diverse utility in spin coating of a variety of materials on a number of different types of substrates and workpieces.

DISCLOSURE OF THE INVENTION

An advantage of the present invention is improved compositions for applying a layer of a resist or thermoplastic material on a hydrophilic surface of a substrate with improved wettability.

Another advantage of the present invention is improved compositions for spin coating a layer of a resist or thermoplastic material on a hydrophilic surface of a substrate for a magnetic or magneto-optical (MO) recording medium, with improved wettability of the surface.

Yet another advantage of the present invention is improved methods for making compositions for applying a layer of a resist or thermoplastic material on a hydrophilic surface of a substrate with improved wettability.

Still another advantage of the present invention is improved methods for making compositions for spin coating a layer of a resist or thermoplastic material on a hydrophilic surface of a substrate for a magnetic or magneto-optical (MO) recording medium, with improved wettability of the surface.

A further advantage of the present invention is an improved method of manufacturing patterned magnetic or magneto-optical (MO) recording media.

A still further advantage of the present invention is an improved method of manufacturing servo patterned magnetic or magneto-optical (MO) recording media, utilizing improved compositions for spin coating a layer of a resist or thermoplastic material on a hydrophilic surface of a substrate for the magnetic or magneto-optical (MO) recording medium, with improved wettability of the surface.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a composition for spin coating a layer of a resist or thermoplastic material on a hydrophilic surface of a substrate with improved wettability of the resist or thermoplastic material, comprising:

a resist or thermoplastic material in the form of an ionic complex derived from a precursor resist or thermoplastic material comprising a hydrophobic polymer chain, and a solvent for the resist or thermoplastic material.

According to embodiments of the present invention, the ionic complex is derived from a precursor resist or thermoplastic material comprising a hydrophobic polymer chain including a plurality of similarly structured, un-ionized pendant groups, wherein the hydrophobic polymer chain is modified to include a major fraction of un-ionized pendant groups and a minor fraction of ionized pendant groups.

In accordance with certain embodiments of the present invention, the resist or thermoplastic material comprises an ionic complex of a poly(methylmethacrylate) ("PMMA") including a hydrophobic polymer chain having a plurality of pendant groups, wherein the major fraction of the pendant groups are un-ionized ester groups and the minor fraction of the pendant groups are ionized carboxylate (—COO$^-$) groups.

According to particular embodiments of the present invention, each of the ionized pendant groups comprises a carboxylate of a metal cation; and the solvent comprises anisole.

Another aspect of the present invention is a composition for spin coating a layer of a resist or thermoplastic material on a hydrophilic surface of a substrate with improved wettability of the resist or thermoplastic material, comprising:

(a) a resist or thermoplastic material comprising a hydrophobic polymer chain;

(b) an organic solvent for the resist or thermoplastic material; and (c) a strongly polar organic material soluble in the organic solvent, wherein the proportion by volume of the polar organic material to the organic solvent is sufficiently low as to inhibit precipitation of the resist or thermoplastic material.

According to embodiments of the present invention, the resist or thermoplastic polymer material comprises a PMMA; the organic solvent comprises anisole; and the strongly polar organic material comprises an alcohol, e.g., the strongly polar organic material comprises methanol ($CH_3OH$) or ethanol ($C_2H_5OH$).

Still another aspect of the present invention is a method of making a composition for spin coating a layer of a resist or thermoplastic material on a hydrophilic surface of a substrate with improved wettability of the resist or thermoplastic material, comprising steps of:

(a) providing a solution comprised of a precursor resist or thermoplastic material having a hydrophobic polymer chain and an organic solvent; and (b) forming an ionic complex of the precursor resist or thermoplastic material.

According to embodiments of the present invention, step (a) comprises providing a solution comprised of a precursor resist or thermoplastic material including a hydrophobic polymer chain including a plurality of similarly structured, un-ionized pendant groups; and step (b) comprises modifying the hydrophobic polymer chain of the precursor to include a major fraction of un-ionized pendant groups and a minor fraction of ionized pendant groups.

In accordance with certain embodiments of the present invention, step (a) comprises providing a solution comprised of a precursor resist or thermoplastic material in the form of a PMMA including a polymer chain with a plurality of similarly structured, ester pendant groups; and step (b) comprises modifying the polymer chain to include a major fraction of the ester pendant groups and a minor fraction of ionized carboxylate (—COO$^-$) groups.

According to particular embodiments of the present invention, step (b) comprises introducing an ionic salt or a base to the solution provided in step (a), wherein the amount of ionic salt or base added to the solution is small relative to the amount of precursor resist or thermoplastic material in the solution, whereby only a minor fraction of the ester pendant groups are converted to the ionized carboxylate (—COO$^-$) groups, e.g., as where step (b) comprises introducing $K_2CO_3$ as said ionic salt or NaOH or KOH as the base.

Yet another aspect of the present invention is a method of making a composition for spin coating a layer of a resist or thermoplastic material on a hydrophilic surface of a substrate with improved wettability of the resist or thermoplastic material, comprising steps of:

(a) providing a solution comprised of a resist or thermoplastic material having a hydrophobic polymer chain and an organic solvent; and (b) introducing into the solution a strongly polar organic material in a small amount relative to the amount of the resist or thermoplastic material in the solution, such that precipitation of the resist or thermoplastic material is inhibited.

According to embodiments of the present invention, step (a) comprises providing a solution of a PMMA in anisole; and step (b) comprises introducing an alcohol selected from methanol ($CH_3OH$) or ethanol ($C_2H_5OH$) to the solution.

A further aspect of the present invention is a method of manufacturing patterned magnetic or magneto-optical (MO) recording media, comprising steps of:

(a) providing a workpiece including a substrate for a magnetic or magneto-optical (MO) recording medium, the workpiece including at least one major surface of hydrophilic character;

(b) providing a liquid composition comprising a resist or thermoplastic polymer material, the composition adapted for substantially complete wetting of the at least one major surface of the workpiece;

(c) forming a layer of the resist or thermoplastic polymer material on the at least one major surface of the workpiece, comprising applying a thin layer of the liquid composition to the at least one major surface of the workpiece; and (d) patterning the at least one major surface of said workpiece utilizing the layer of the resist or thermoplastic polymer material.

According to certain embodiments of the present invention, step (d) comprises forming a servo pattern in the at least one major surface of the workpiece.

In accordance with embodiments of the present invention, step (a) comprises providing a workpiece wherein the at least one major surface of hydrophobic character is a bare surface of a substrate for a magnetic or magneto-optical (MO) recording medium or the surface of an uppermost layer of a laminate of layers formed on a substrate for a magnetic or magneto-optical (MO) recording medium; and step (c) comprises applying the thin layer of the liquid composition to the at least one major surface of the workpiece by spin coating.

According to particular embodiments of the present invention, step (b) comprises providing a liquid composition comprising the resist or thermoplastic material in the form of an ionic complex derived from a precursor resist or thermoplastic material comprising a hydrophobic polymer chain, and a solvent for the resist or thermoplastic material, e.g., step (b) comprises providing an ionic complex derived from a precursor resist or thermoplastic material comprising a hydrophobic polymer chain including a plurality of similarly structured, un-ionized pendant groups, wherein the hydrophobic polymer chain is modified to include a major fraction of un-ionized pendant groups and a minor fraction of ionized pendant groups.

In accordance with certain preferred embodiments of the present invention, step (b) comprises providing an ionic complex of a PMMA including a hydrophobic polymer chain having a plurality of pendant groups, wherein the major fraction of the pendant groups are un-ionized ester groups and the minor fraction of the pendant groups are ionized carboxylate ($-COO^-$) groups, and the solvent is anisole.

According to certain other preferred embodiments of the present invention, step (b) comprises providing a liquid composition comprising a resist or thermoplastic material including a hydrophobic polymer chain, an organic solvent for the resist or thermoplastic material, and a strongly polar organic material soluble in the organic solvent, wherein the proportion by volume of the polar organic material to the organic solvent is sufficiently low as to inhibit precipitation of the resist or thermoplastic material, e.g., step (b) comprises providing a liquid composition comprising the resist or thermoplastic material in the form of a solution of a PMMA in anisole as the organic solvent, to which a strongly polar alcohol selected from methanol ($CH_3OH$) or ethanol ($C_2H_5OH$) is added.

A still further aspect of the present invention is a composition for spin coating a layer of a resist or thermoplastic material on a hydrophilic surface of a substrate with improved wettability of the resist or thermoplastic material, comprising:

(a) a resist or thermoplastic material comprising a hydrophobic polymer chain or a modified polymer chain; and (b) means for enhancing the wettability of the resist or thermoplastic material when applied as a layer to a hydrophilic surface.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the pertinent features are not necessarily drawn to scale but rather are drawn as to best illustrate the pertinent features, wherein.

DESCRIPTION OF THE INVENTION

Figure 1:
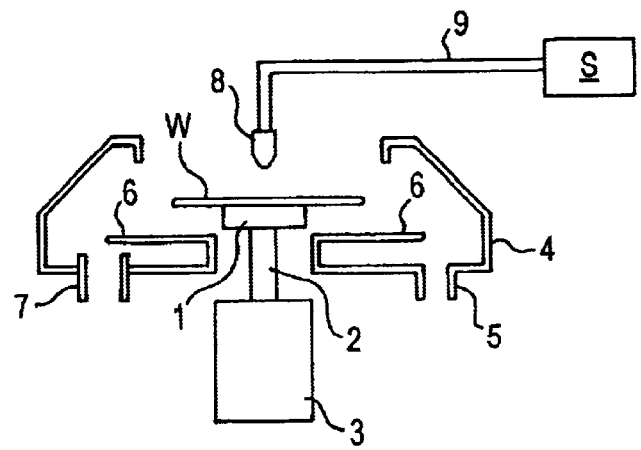
FIG. 1 is a schematic, simplified cross-sectional view of a conventional spin coating apparatus utilized for applying a layer of resist or thermoplastic polymer material to a surface of a workpiece/substrate.
Figure 2A:
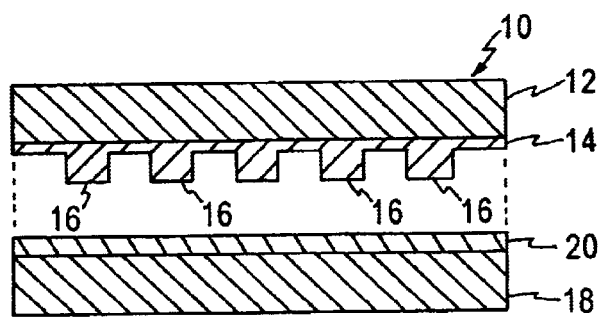
FIGS. 2(A)–2(D) are schematic, simplified cross-sectional views illustrating a process sequence for performing thermal imprint lithography of a layer of resist of thermoplastic polymer material on a surface of a workpiece/substrate.
Figure 2B:
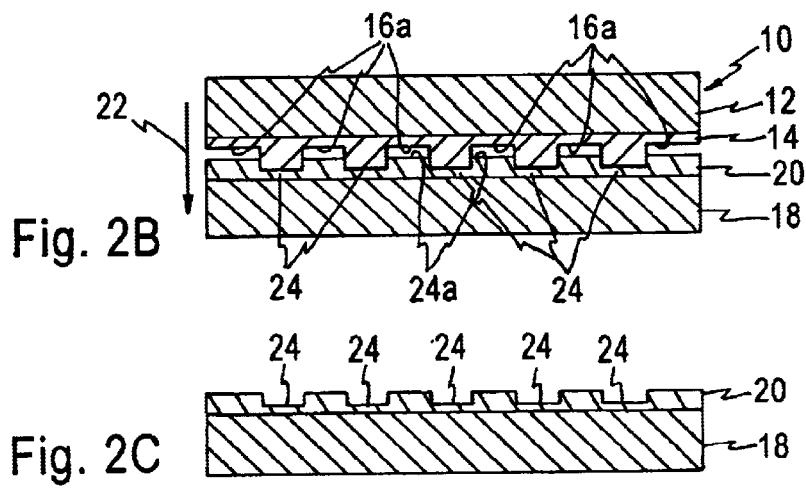
Figure 2C:
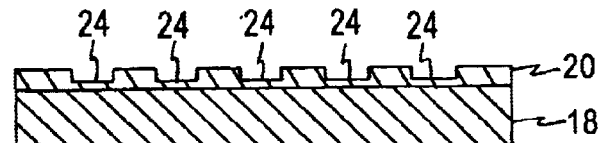
Figure 2D:
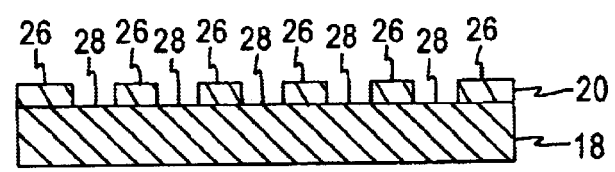

The present invention addresses, solves, and effectively eliminates, or at least minimizes, difficulties, drawbacks, and disadvantages attendant upon performing spin coating of hydrophilic surfaces of workpieces/substrates, e.g., workpieces/substrates utilized in the manufacture of thin film magnetic and/or magneto-optical (MO) recording media in disk form, with hydrophobic resist and/or thermoplastic polymer materials, notably poor wettability of the workpiece/substrate surface by the resist or thermoplastic polymer material, resulting in uneven surface coverage, hence non-uniform thickness of the ultimately formed resist or thermoplastic polymer layer, and excessive resist consumption. The present invention is based upon the discovery that incompatibility between conventionally utilized, generally hydrophobic spun-on resist or thermoplastic material compositions and the generally hydrophilic disk-shaped workpieces/substrates utilized in magnetic and/or MO recording media manufacture, typically manifested in poor wetting of the latter by the former and leading to "beading" of the resist or thermoplastic material on the disk surface, can be substantially eliminated, or at least minimized, by increasing the polarity of conventional resist or thermoplastic materials/compositions, e.g., by chemical modification of the resist or thermoplastic polymer material per se to increase its hydrophilic character, or by modification of the resist or thermoplastic polymer composition to increase the hydrophilic character thereof. Advantageously, the inventive methodology utilizes conventional resist or thermoplastic materials and/or compositions, and minimizes consumption thereof when utilized for spin coating disk-shaped workpieces/substrates such as are utilized in the manufacture of thin film magnetic and/or MO recording media, while maintaining full compatibility with all aspects of conventional automated manufacturing technology for recording media manufacture. Moreover, the means and methodology afforded by the present invention enjoy diverse utility in spin coating of a variety of materials on a number of different types of substrates and workpieces.

As indicated above, according to the present invention, a small amount of a material, e.g., a material which is ionic or comprises a polar group, is added to a composition comprised of a solution of a resist or thermoplastic material having a polymer chain, to interact therewith to increase the polarity, thus hydrophilic character, of the composition. The increased hydrophilic character of the resist or thermoplastic material composition is manifested in increased wetting and adhesion of the composition to the typically hydrophilic surfaces of workpieces/substrates utilized in thin film recording media manufacture, e.g., non-magnetic metals and alloys, glass, and magnetic or MO media precursors (i.e., substrates with a laminate of layers including a recording layer formed thereon), etc. The interaction between the material added to the solution of resist or thermoplastic material may, in some instances, be in the form of a chemical reaction between the additive and portions of the polymer chain, whereas in other instances, the interaction between the additive and the resist or thermoplastic material may be weaker, e.g., as in hydrogen bonding or Van der Waals interactions. In the former instance, the product resulting from reaction between the ionic or polar additive and the resist or thermoplastic material must be fully miscible in the solvent without any precipitate formation. Moreover, regardless of the mechanism of the interaction between the ionic or polar additive and the resist or thermoplastic material, the physical and optical properties of the resultant composition must be either unchanged or enhanced vis-a-vis those of the conventional, unmodified compositions, in order to facilitate aspects of the above-described imprinting process, e.g., adhesion to the workpiece/substrate surface, pattern formation therein, and stamper/imprinter release.

Whereas the inventive methodology may be utilized with a wide variety of resist and/or thermoplastic polymer compositions, the essential principles are consistent, as shown in the below-described illustrative examples involving a conventionally employed composition for performing resist or thermoplastic spin-on coating of disk-shaped substrates in the manufacture of servo-patterned thin film magnetic and/or MO recording media by thermal imprint lithography. Specifically, the principles of the inventive methodology are illustrated below with reference to spin-on coating compositions comprised of a PMMA in an organic solvent, typically methoxybenzene ("anisole").

PMMA is a widely utilized class of thermoplastic acrylic polymers including an elongated, generally hydrophobic hydrocarbon chain composed of a plurality n of chemically interconnected monomer units, each with an unionized pendant ester (—COOR, where R is methyl, —CH$_3$) group and anisole is a commonly utilized non-toxic, organic solvent therefor. Their molecular structures are as shown below.

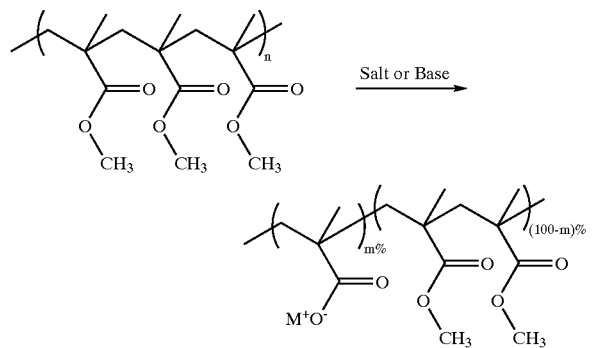

The polarity, hence hydrophilic character, of the PMMA molecules or the PMMA/solvent spin-coating compositions can be increased by either of two methods according to the present invention. In accordance with the first method, a small amount, e.g., from about 0.1 to about 0.25 mol. % of an ionic (or ionizable) material, e.g., an ionic salt such as K$_2$CO$_3$ or a base such as NaOH or KOH, is added to a solution of a PMMA in a suitable organic solvent, e.g., anisole, to chemically react therewith to form an ionic complex wherein a small percentage, e.g., from about 0.001 to about 0.002% of the unionized methyl ester pendant groups (—COOCH$_3$) are converted to ionized, hence polar, carboxylate (—COO$^-$) groups, as indicated below.

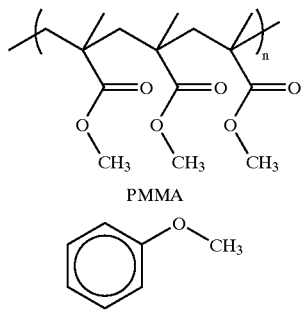

Methoxybenzene (anisole)

As noted supra, the quantity of ionic salt or base added to the solution of PMMA/solvent must be kept small, e.g., from about 0.1 to about 0.25 mol. %, in order to avoid substantial modification of the PMMA chain. In general, the amount of ionic salt or base added to the composition depends upon the resist/solvent ratio, i.e., the PMMA/anisole ratio. The ionic complex including a small proportion of ionized carboxylate (—COO$^-$) groups readily adheres to the disk-shaped substrates utilized in the manufacture of thin film magnetic and/or MO recording media, notably glass and glass-based substrates, and provides uniform and complete surface coverage without incurring "beading" leading to excessive resist consumption.

According to the second method, a small amount of an organic molecule having a highly polar group or moiety, e.g., an —OH group, is added to the resist solution (PMMA/anisole) to increase the overall polarity thereof, hence hydrophilic character, of the resist composition. Illustratively, the highly polar organic molecule may be selected from among simple, short chain alcohols such as methanol (CH$_3$OH) and ethanol (C$_2$H$_5$OH), the amount of alcohol added to the resist solution of PMMA in anisole must be kept relatively low, e.g., <5 vol. %, in order to avoid isolating (i.e., separating) the PMMA molecules from the anisole solvent, resulting in precipitation of the PMMA.

While not desirous of being bound by any particular theory, it is nevertheless believed that, as long as the polar additive is a simple enough molecule, e.g., CH$_3$OH or C$_2$H$_5$OH, dissociation thereof will occur in the PMMA/anisole solution to yield polar alkoxy groups CH$_3$O$^-$ or C$_2$H$_5$O$^-$, respectively, thus increasing the overall polarity, hence hydrophilic character, of the PMMA/anisole solution. This approach affords an advantage in that during the baking process of the spin-coated workpieces/substrates to remove the volatile solvent (anisole), the additive in the form of a volatile, simple organic molecule (CH$_3$OH or C$_2$H$_5$OH) is also evaporated, leaving a substantially pure resist layer (PMMA) on the workpiece/substrate surface. As a consequence, there is no apparent change in the PMMA/substrate interface due to the addition of the polar organic molecule to the liquid resist composition initially spun-on the workpiece/substrate surface.

EXAMPLES

In one set of experiments for verifying the efficacy of the first method according to the invention, NiP-coated Al disk substrates for thin film magnetic recording media were spin-coated with a conventional PMMA resist solution with 97% anisole dilution and with a similar PMMA/anisole solution modified according to the invention to contain 1 mol. % K$_2$CO$_3$. Candela reflectivity measurements of the spun-coated disks indicated substantially better surface coverage by the $K_2CO_3$-modified PMMA/anisole solution than by the conventional solution.

Another set of experiments for verifying the efficacy of the second method according to the invention was performed with similar NiP-coated Al disk substrates for thin film magnetic recording media, using the conventional PMMA resist solution with 97% anisole dilution and a modified PMMA composition comprising 4.8 vol. % methanol ($CH_3OH$) in 92.4 vol. % anisole and 2.8 vol. % PMMA, in which frame-by-frame scans of the spin coating process were obtained (each frame being for an about 1/15 sec. interval). Identical spin speeds and dispensing volumes were utilized and the NiP-coated Al substrates were freshly cleaned in order to present similar hydrophilic surfaces for coating thereon. The frame-by-frame images thus obtained clearly indicated that the first droplet of the $CH_3OH$-modified PMMA/anisole spin coating composition easily wetted the disk surface, whereas the first droplet of the conventional PMMA/anisole spin coating composition formed beads across the disk surface. Similar behavior is observed for the second and subsequent droplets applied to the disk surface.

Conventional practices for overcoming the "beading" effect associated with the conventional PMMA/anisole spin coating composition involve increasing the dispense quantity (i.e., dispense pressure) of the spin coating composition or pre-wetting the substrate surface with a polar liquid or solution. However, each of these remedies greatly increases the consumption rate of the spin coating composition or increases the process time. As a consequence, the overall cost of the spin coating process is correspondingly increased. By contrast, the inventive methodology has demonstrated an about 3-fold reduction in resist consumption without significant increase in process time, thus minimizing resist and overall process cost.

A less desirable alternative to the inventive methodology comprising modification of the resist spin coating composition is to apply a passivating, monolayer thick film of an organic solvent which primes the disk surface for adhesion of the resist, e.g., PMMA. While such technique is effective for increasing the PMMA adhesion, an additional step, hence process time, is undesirably required for performing the spin coating process.

Thus, the present invention advantageously provides spin coating compositions and methodology for performing high quality spin coating of resist or thermoplastic polymer layers on substrates with hydrophilic surfaces, e.g., disk-shaped substrates utilized in the manufacture of magnetic and MO recording media, to form smooth, substantially uniform thickness spin-coated layers of resist or thermoplastic polymers which may, for example, be utilized in performing servo patterning of such type magnetic and MO recording media, as by thermal imprint lithography. In addition to such utility in performing servo patterning of disk substrates, the inventive compositions and methodology are filly compatible with all other aspects of automated manufacture of magnetic and MO media and are useful in a variety of other industrially significant applications, including, but not limited to, spin coating of semiconductor wafers as part of IC device manufacture.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A composition for spin coating a layer of a resist or thermoplastic material on a hydrophilic surface of a substrate with improved wettability of said resist or thermoplastic material, comprising:

a resist or thermoplastic material in the form of an ionic complex derived from a precursor resist or thermoplastic material comprising a hydrophobic polymer chain.

2. The composition as in claim 1, further comprising:

a solvent for said resist or thermoplastic material.

3. The composition as in claim 2, wherein:

said ionic complex is derived from a precursor resist or thermoplastic material comprising a hydrophobic polymer chain including a plurality of similarly structured, un-ionized pendant groups, wherein said hydrophobic polymer chain is modified to include a major fraction of un-ionized pendant groups and a minor fraction of ionized pendant groups.

4. The composition as in claim 3, wherein:

said resist or thermoplastic material comprises an ionic complex of a poly(methylmethacrylate) ("PMMA") including a hydrophobic polymer chain having a plurality of pendant groups, wherein said major fraction of said pendant groups are un-ionized ester groups and said minor fraction of said pendant groups are ionized carboxylate (—$COO^-$) groups.

5. The composition as in claim 4, wherein:

each of said ionized pendant groups comprises a carboxylate of a metal cation.

6. The composition as in claim 4, wherein:

said solvent comprises anisole.

7. A composition for spin coating a layer of a resist or thermoplastic material on a hydrophilic surface of a substrate with improved wettability of said resist or thermoplastic material, comprising:

(a) a resist or thermoplastic material comprising a hydrophobic polymer chain;

(b) an organic solvent for said resist or thermoplastic material; and (c) a strongly polar organic material soluble in said organic solvent, wherein the proportion by volume of said polar organic material to said organic solvent is sufficiently low as to inhibit precipitation of said resist or thermoplastic material.

8. The composition as in claim 7, wherein:

said resist or thermoplastic polymer material comprises a poly(methylmethacrylate) ("PMMA");

said organic solvent comprises anisole; and said strongly polar organic material comprises an alcohol.

9. The composition as in claim 8, wherein:

said strongly polar organic material comprises methanol ($CH_3OH$) or ethanol ($C_2H_5OH$).

10. A method of making a composition for spin coating a layer of a resist or thermoplastic material on a hydrophilic surface of a substrate with improved wettability of said resist or thermoplastic material, comprising steps of:

(a) providing a solution comprised of a precursor resist or thermoplastic material having a hydrophobic polymer chain and an organic solvent; and (b) forming an ionic complex of said precursor resist or thermoplastic material.

11. The method according to claim 10, wherein:

step (a) comprises providing a solution comprised of a precursor resist or thermoplastic material including a hydrophobic polymer chain including a plurality of similarly structured, un-ionized pendant groups; and step (b) comprises modifying said hydrophobic polymer chain of said precursor to include a major fraction of un-ionized pendant groups and a minor fraction of ionized pendant groups.

12. The method according to claim 11, wherein:

step (a) comprises providing a solution comprised of a precursor resist or thermoplastic material in the form of a poly(methylmethacrylate) ("PMMA") including a polymer chain with a plurality of similarly structured, ester pendant groups; and step (b) comprises modifying said polymer chain to include a major fraction of said ester pendant groups and a minor fraction of ionized carboxylate (—COO$^-$) groups.

13. The method according to claim 12, wherein:

step (b) comprises introducing an ionic salt or a base to the solution provided in step (a), wherein the amount of ionic salt or base added to said solution is small relative to the amount of precursor resist or thermoplastic material in said solution, whereby only a minor fraction of said ester pendant groups are converted to said ionized carboxylate (—COO$^-$) groups.

14. The method according to claim 13, wherein:

step (b) comprises introducing $K_2CO_3$ as said ionic salt or NaOH or KOH as said base.

15. A method of making a composition for spin coating a layer of a resist or thermoplastic material on a hydrophilic surface of a substrate with improved wettability of said resist or thermoplastic material, comprising steps of:

(a) providing a solution comprised of a resist or thermoplastic material having a hydrophobic polymer chain and an organic solvent; and (b) introducing into said solution a strongly polar organic material in a small amount relative to the amount of said resist or thermoplastic material in said solution, such that precipitation of said resist or thermoplastic material is inhibited.

16. The method according to claim 15, wherein:

step (a) comprises providing a solution of a poly (methylmethacrylate) ("PMMA") in anisole; and step (b) comprises introducing an alcohol selected from methanol ($CH_3OH$) or ethanol ($C_2H_5OH$) to said solution.

17. A composition for spin coating a layer of a resist or thermoplastic material on a hydrophilic surface of a substrate with improved wettability of said resist or thermoplastic material, comprising:

(a) a resist or thermoplastic material comprising a hydrophobic polymer chain or a modified polymer chain; and (b) means for enhancing the wettability of said resist or thermoplastic material when applied as a layer to a hydrophilic surface.

* * * * *